US012675251B2

(12) United States Patent
Tan et al.

(10) Patent No.: US 12,675,251 B2
(45) Date of Patent: Jul. 7, 2026

(54) MULTI-SCREEN DISPLAY METHOD FOR CLOUD DESKTOP, CLOUD TERMINAL, STORAGE MEDIUM AND SYSTEM

(71) Applicant: ZTE CORPORATION, Shenzhen (CN)

(72) Inventors: Zhilin Tan, Shenzhen (CN); Langping Xu, Shenzhen (CN); Wanwu Yin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/997,259

(22) PCT Filed: Jun. 6, 2023

(86) PCT No.: PCT/CN2023/098670
§ 371 (c)(1),
(2) Date: Jan. 21, 2025

(87) PCT Pub. No.: WO2024/016873
PCT Pub. Date: Jan. 25, 2024

(65) Prior Publication Data
US 2026/0029978 A1 Jan. 29, 2026

(30) Foreign Application Priority Data

Jul. 21, 2022 (CN) .......................... 202210865573.5

(51) Int. Cl.
*G06F 9/451* (2018.01)
*G06F 3/14* (2006.01)
(52) U.S. Cl.
CPC ............ *G06F 3/1446* (2013.01); *G06F 9/452* (2018.02)

(58) Field of Classification Search
None
See application file for complete search history.

(56) References Cited

U.S. PATENT DOCUMENTS

2014/0130042 A1 5/2014 Luxenberg et al.
2020/0133459 A1* 4/2020 Bender ..................... G09G 5/08
2022/0374252 A1* 11/2022 Kelly ................. G06F 9/44505

FOREIGN PATENT DOCUMENTS

CN 104396207 A 3/2015
CN 112263642 A 1/2021
(Continued)

OTHER PUBLICATIONS

International Search Report for corresponding application PCT/CN2023/098670 filed Jun. 6, 2023; Mail Jul. 31, 2023.
(Continued)

*Primary Examiner* — Carl Adams
(74) *Attorney, Agent, or Firm* — CANTOR COLBURN LLP

(57) ABSTRACT
Disclosed are a multi-screen display method for a cloud desktop, a cloud terminal, a storage medium and a system, which belong to the field of electronic digital data processing. The method is applied to a cloud terminal comprising a main screen and a secondary screen, and comprises: configuring display parameters of the cloud terminal to a server; sending a display request to the server; receiving code streams returned by the server in response to the display request according to the display parameters, wherein the code streams are generated by the server according to the resolutions in the display parameters; searching, according to the display parameters, for a main screen and a secondary screen matching the code streams; and displaying the code streams on a main screen display interface and a secondary screen display interface.

15 Claims, 4 Drawing Sheets

(56)         References Cited

FOREIGN PATENT DOCUMENTS

| CN | 112416483 A | 2/2021 |
|----|-------------|--------|
| CN | 112672169 A | 4/2021 |
| CN | 113190312 A | 7/2021 |

OTHER PUBLICATIONS

Written Opinion for corresponding application PCT/CN2023/098670 filed Jun. 6, 2023; Mail Jul. 31, 2023.
European Search Report for corresponding application EP23841940: Report dated Oct. 16, 2025.

* cited by examiner

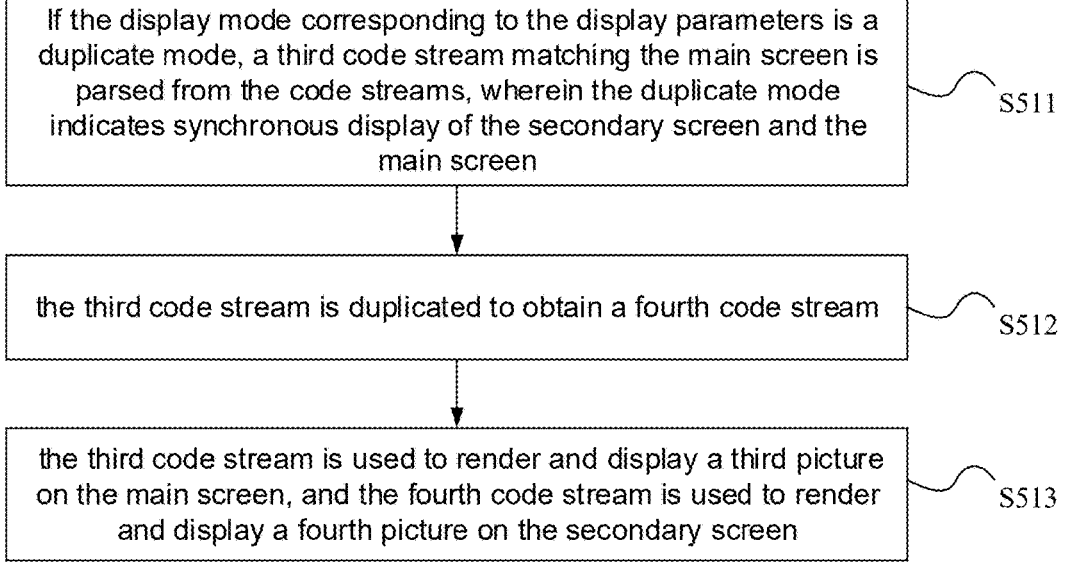

If the display mode corresponding to the display parameters is a duplicate mode, a third code stream matching the main screen is parsed from the code streams, wherein the duplicate mode indicates synchronous display of the secondary screen and the main screen — S511 the third code stream is duplicated to obtain a fourth code stream — S512 the third code stream is used to render and display a third picture on the main screen, and the fourth code stream is used to render and display a fourth picture on the secondary screen — S513

Fig. 4

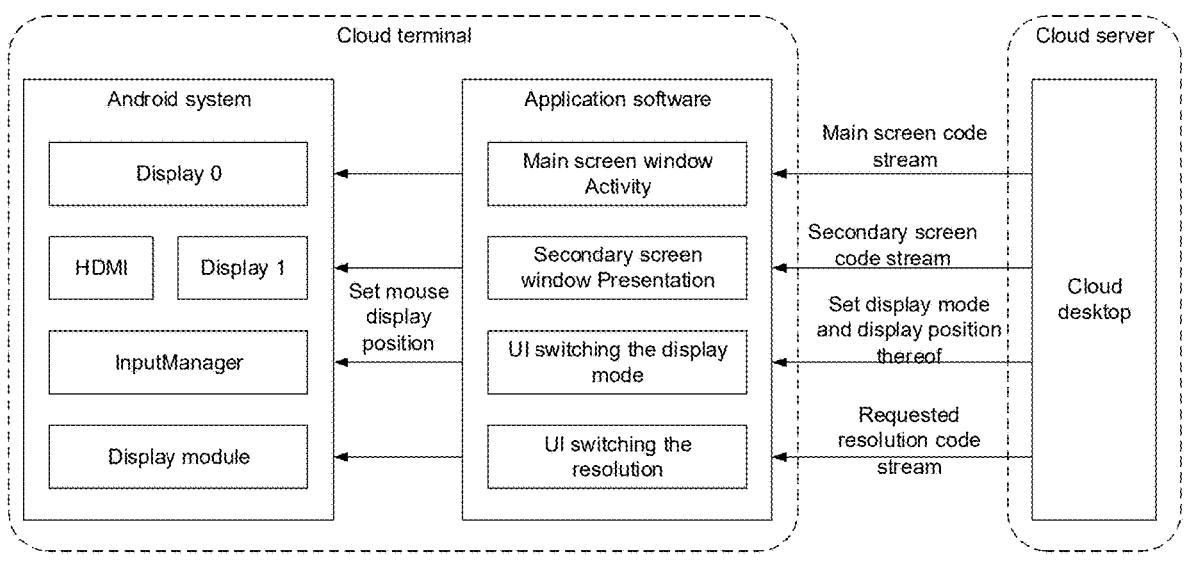

Fig. 5

MULTI-SCREEN DISPLAY METHOD FOR CLOUD DESKTOP, CLOUD TERMINAL, STORAGE MEDIUM AND SYSTEM

CROSS-REFERENCE TO RELATED DISCLOSURE

This disclosure is a national stage filing under 35 U.S.C. § 371 of international application number PCT/CN2023/098670, filed Jan. 25, 2024, which claims priority to Chinese Patent Application No. CN202210865573.5 filed on Jul. 21, 2022 and entitled "Multi-Screen Display Method For Cloud Desktop, Cloud Terminal, Storage Medium and System", which is incorporated herein by reference in its entirety:

TECHNICAL FIELD

The embodiments of the present disclosure relate to the technical field of electronic digital data processing, and in particular, to a multi-screen display method, a cloud terminal, a storage medium and a system.

BACKGROUND

A cloud desktop, also referred to as desktop virtualization or a cloud computer, is a new mode for replacing conventional computers, is mainly composed of a server, a cloud terminal, cloud desktop software, etc., and virtualizes in a back-end server all components such as CPU, memory and hard disk that are included in conventional computer hosts. The cloud terminal of the cloud desktop does not participate in the operation work of the desktop connected, but merely serves the functions of connection and display. A user accesses a virtual machine host on the back-end server via a specific communication protocol so as to realize an interactive operation, thereby achieving an experience effect consistent with the computer.

At present, a Windows system has a multi-screen extension function, and an extended display domain can bring great experience and efficiency improvements to the user in game or office scenarios. With the increase of demands, an Android system also provides the Presentation class for realizing a multi-screen display function, which is mainly applied to a split-type touch screen device. However, screens are independent of each other, have no logical relationship, do not support cross-screen display, and do not interact with each other in terms of events. Therefore, it is not possible to integrate with the multi-screen operating system of the cloud terminal in usage scenarios of the cloud terminal.

SUMMARY

The embodiments of the present disclosure provide a multi-screen display method, an apparatus, an electronic device and a storage medium, so as to solve the technical problem in the related art that multi-screen display cannot be realized in usage scenarios of the cloud terminal.

According to one aspect of the embodiments of the present disclosure, a multi-screen display method is provided, which is applied to a cloud terminal comprising a main screen and a secondary screen, and comprises: display parameters of the cloud terminal are configured to a server; a display request is sent to the server; code streams returned by the server in response to the display request according to the display parameters are received, wherein the code streams are generated by the server according to the resolutions in the display parameters; a main screen and a secondary screen matching the code streams are searched for according to the display parameters; and the code streams are displayed on a main screen display interface and a secondary screen display interface.

According to another aspect of the embodiments of the present disclosure, a multi-screen display method is further provided, which is applied to a server. The server is connected to a cloud terminal, and the method comprises: display parameters sent by the cloud terminal are received; a display request sent by the cloud terminal is received; code streams in response to the display request are generated according to the display parameters; and the code streams are delivered to the cloud terminal.

According to another aspect of the embodiments of the present disclosure, a cloud terminal is further provided. The cloud terminal comprises a memory, a processor, and a computer program which is stored on the memory and capable of running on the processor, and the computer program, when executed by the processor, implements the steps of the described multi-screen display method applied to a cloud terminal comprising a main screen and a secondary screen.

According to another aspect of the embodiments of the present disclosure, a storage medium is further provided. The storage medium stores a computer program which, when executed by a processor, implements the steps of the described multi-screen display method.

According to another aspect of the embodiments of the present disclosure, a multi-screen display system is further provided. The system comprises a cloud terminal and a server, wherein the server is connected to the cloud terminal, and the cloud terminal is configured to configure display parameters of the cloud terminal to the server; send a display request to the server; receive code streams returned by the server in response to the display request according to the display parameters; search, according to the display parameters, for a main screen and a secondary screen matching the code streams; and display the code streams on a main screen display interface and a secondary screen display interface; and the server is configured to receive display parameters sent by the cloud terminal; receive a display request sent by the cloud terminal; generate, according to the display parameters, code streams in response to the display request; and deliver the code streams to the cloud terminal.

The embodiments of the present disclosure further provide a computer program product comprising an instruction which, when running on a computer, causes a computer to execute the steps in the described method.

BRIEF DESCRIPTION OF THE DRAWINGS

Drawings provided therein for further understanding of the present disclosure form a part of the present disclosure, and the exemplary embodiments of the present disclosure and the illustrations thereof are used to explain the present disclosure, and do not form improper limits to the present disclosure. In the drawings:

FIG. 4 is a detailed flowchart of the step of displaying the code streams on a main screen display interface and a secondary screen display interface according to another implementation of an embodiment of the present disclosure;

FIG. 5 is a structural block diagram of an application system in an implementation scenario of the present disclosure.

DETAILED DESCRIPTION OF THE EMBODIMENTS

In order to make persons skilled in the art better understand the solutions of the present disclosure, the following clearly and completely describes the technical solutions in the embodiments of the present disclosure with reference to the drawings in the embodiments of the present disclosure. Apparently, the described embodiments are merely some of rather than all of the embodiments of the present disclosure. All other embodiments obtained by a person of ordinary skill in the art based on the embodiments of the present disclosure without inventive efforts shall belong to the scope of protection of the present disclosure. It should be noted that the embodiments of the present disclosure and the features in the embodiments may be combined with each other without conflict.

It should be noted that, terms such as "first" and "second" in the description and the claims of the present disclosure and the described drawings are used to distinguish similar objects, but are not necessarily used to describe a specific sequence or order. It should be understood that the data so used may be interchanged where appropriate such that the embodiments of the present disclosure described herein can be implemented in sequences other than those illustrated or described herein. In addition, the terms "comprise" and "have", and any variations thereof, are intended to cover a non-exclusive inclusion, for example, a process, method, product, or apparatus that includes a series of steps or units is not necessarily limited to those steps or units that are expressly listed, but may include other steps or units that are not expressly listed or inherent to such process, method, product, or apparatus.

Figure 1:
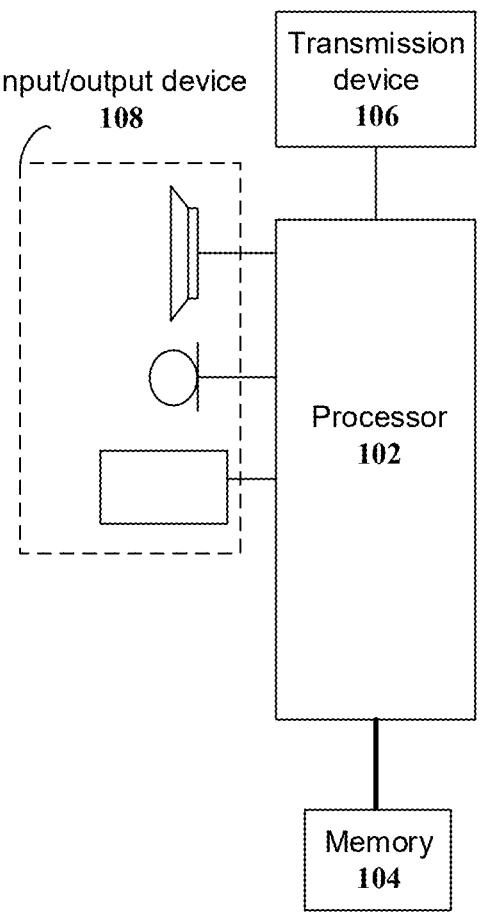
FIG. 1 is a structural block diagram of hardware of a cloud terminal according to an embodiment of the present disclosure.

The method embodiment provided in an embodiment of the present disclosure may be implemented in a server, a mobile phone, a computer, a tablet computer, or a similar computing apparatus. Taking running on a cloud terminal as an example, FIG. 1 is a structural block diagram of hardware of a cloud terminal according to an embodiment of the present disclosure. As shown in FIG. 1, the cloud terminal may comprise one or more (only one is shown in FIG. 1) processors 102 (the processors 102 may include, but are not limited to, a processing apparatus such as a microprocessor MCU or a programmable logic device FPGA) and a memory 104 for storing data. Optionally, the cloud terminal may further comprise a transmission device 106 and an input/output device 108 for a communication function. A person of ordinary skill in the art may understand that the structure shown in FIG. 1 is merely exemplary, which does not limit the structure of the described cloud terminal. For example, the cloud terminal may further comprise more or less components than that shown in FIG. 1, or have a different configuration from that shown in FIG. 1.

The memory 104 may be configured to store a cloud terminal program, for example, a software program of application software and modules, such as a cloud terminal program corresponding to the multi-screen display method in an embodiment of the present disclosure. The processor 102 runs the cloud terminal program stored in the memory 104, so as to execute various function applications and data processing, i.e. implement the described method. The memory 104 may include a high-speed random access memory, and may also include a non-volatile memory, such as one or more magnetic storage apparatuses, flash memory, or other non-volatile solid-state memory. In some examples, the memory 104 may further include a memory remotely located with respect to the processor 102, and the remote memory may be connected to a cloud terminal over a network. Examples of the described network include, but are not limited to, the Internet, intranets, local area networks, mobile communication networks, and combinations thereof.

The transmission device 106 is configured to receive or transmit data via a network. Specific examples of the described network may include a wireless network provided by a communication provider of the cloud terminal. In an example, the transmission device 106 includes a Network Interface Controller (NIC) that may be coupled to other network devices via a base station to communicate with the Internet. In an example, the transmission device 106 may be a Radio Frequency (RF) module configured to wirelessly communicate with the Internet.

Figure 2:
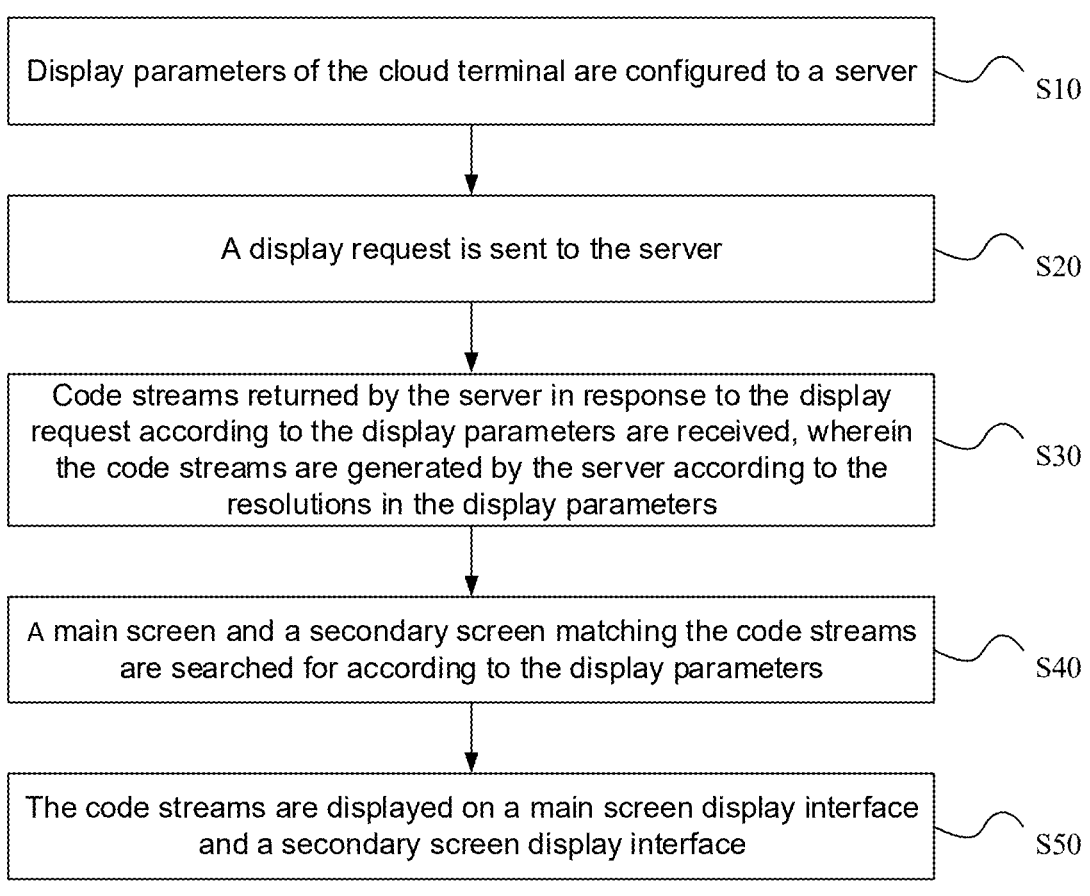
FIG. 2 is a flowchart of a multi-screen display method according to an embodiment of the present disclosure.

This embodiment provides a multi-screen display method applied to a cloud terminal comprising a main screen and a secondary screen. FIG. 2 is a flowchart of a multi-screen display method according to an embodiment of the present disclosure. As shown in FIG. 2, the flow comprises the following steps:

At S10: display parameters of the cloud terminal are configured to a server.

The multi-screen display method in this embodiment is applied to a cloud terminal comprising a main screen and a secondary screen. The cloud terminal may be externally connected to a display and a keyboard device, and accesses a virtual machine host on a back-end server via a specific communication protocol after a client is installed, so as to realize an interactive operation. In some examples, the display and the keyboard may also be integrated in a cloud terminal, and the cloud terminal interacts with the server and the user in the form of a cloud computer.

Via a Simple Protocol for Independent Computing Environments (SPICE), the cloud terminal may notify the server side of display parameters configured by the cloud terminal. The SPICE is a communication protocol used in virtualized environments, which allows for connection to a virtual machine desktop on a virtualized platform via the Internet. The configured display parameters may include, but are not limited to, settings of a main screen and a secondary screen connected to the cloud terminal, a display position, the number of display screens, a display mode, the resolutions of the display screens, a refresh rate, and the like.

In an implementation of this embodiment, the step that the display parameters of the cloud terminal are configured to the server comprises: the number of display screens of the cloud terminal is configured to the server; a display mode of the cloud terminal is configured to the server, wherein the display mode is used for indicating the number of display screens connected to the cloud terminal and display logic of each display screen; and the resolutions of the display screens of the cloud terminal are configured to the server.

In this embodiment, the display parameters include the number of display screens, the display mode, and the resolutions of the display screens. The display mode is used for indicating the number of display screens connected to the cloud terminal and display logic of each display screen. For example, the display mode of the cloud terminal may be set to be an extension mode, a duplicate mode or a single-screen mode. The number of display screens connected to the cloud terminal in the extension mode and the duplicate mode is generally not less than two. However, the display logic in the extension mode is multi-screen independent display of a main screen and a secondary screen, where the main screen and the secondary screen display independently, the displayed pictures are not synchronous, and the main screen and the secondary screen can be controlled respectively. In the extension mode, the server delivers a corresponding number of code streams according to the number of display screens configured for the cloud terminal, the main screen and the secondary screen respectively receive and parse their respective code streams to perform rendering and display, thereby realizing asynchronous display of the main screen and the secondary screen. However, in the duplicate mode, the main screen and the secondary screen display synchronously, and the secondary screen displays the same picture as the main screen, and only the main screen can be controlled. The server delivers a code stream in the duplicate mode, the main screen receives the code stream and renders and displays same on the main screen; and a cloud terminal underlying layer duplicates the main screen code stream and displays the duplicated code stream on the secondary screen, thereby realizing the synchronous display of the main screen and the secondary screen. In the single-screen mode with only the main screen or only the secondary screen, the server delivers a code stream matching the resolution in the display parameters, and displays same on the configured main screen or secondary screen.

At S20: a display request is sent to the server.

At S30: code streams returned by the server in response to the display request according to the display parameters are received, wherein the code streams are generated by the server according to the resolutions in the display parameters.

The cloud terminal sends a display request to the server, and upon receiving the display request, the server returns corresponding code streams according to the configured display parameters. For example, the cloud terminal configures itself to the server as an extension mode, wherein the main screen resolution set in the display parameters is 1080 p and the secondary screen resolution is 720 P, and then the server returns a main screen code stream with a resolution of 1080p and a secondary screen code stream with a resolution of 720P to the cloud terminal.

At S40: a main screen and a secondary screen matching the code streams are searched for according to the display parameters.

Upon receiving the code streams returned by the server, the cloud terminal performs screen matching on the received code streams, so as to display the code streams on the matched screens.

The method of searching, according to the display parameters, for the main screen and the secondary screen matching the code streams may be determining respective resolutions of the main screen and the secondary screen, parsing the resolutions of the code streams returned by the server, and matching the code streams with corresponding main screen and secondary screen according to the resolutions. In some examples, it is also possible to match the IDs or device numbers of the main screen and the secondary screen with the ID addresses or device numbers of target screens comprised in the code streams returned by the server, so as to search for the main screen and the secondary screen matching the code streams.

At S50: the code streams are displayed on a main screen display interface and a secondary screen display interface.

The cloud terminal underlying layer receives, via an SPICE desktop protocol, the code streams delivered by the server, and displays same on matched main screen display interface and secondary screen display interface of the cloud terminal.

The embodiments of the present disclosure provide a multi-screen display solution applied to a cloud terminal comprising a main screen and a secondary screen. The server delivers code streams according to display parameters configured by the cloud terminal, and the cloud terminal displays the delivered code streams on a main screen display interface and a secondary screen display interface, thereby realizing multi-screen display of the main screen and the secondary screen in cloud terminal scenarios.

Figure 3:
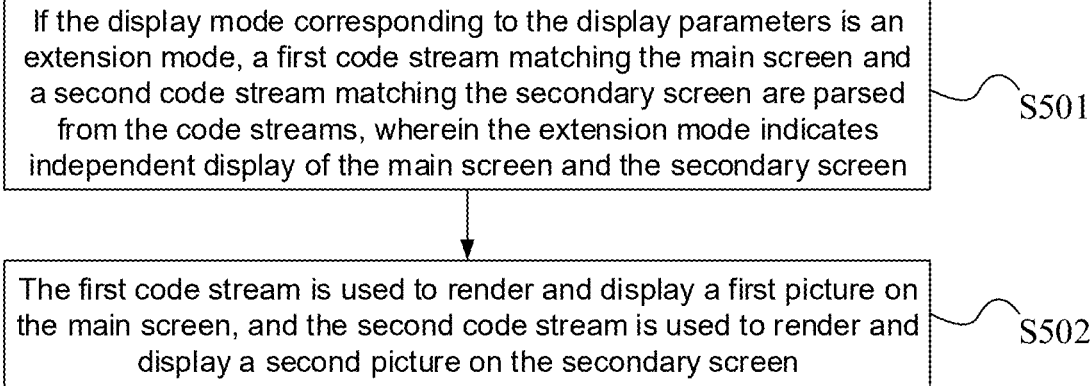
FIG. 3 is a detailed flowchart of the step of displaying the code streams on a main screen display interface and a secondary screen display interface according to one implementation of an embodiment of the present disclosure.

Referring to FIG. 3, in an implementation of this embodiment, the step that the code streams are displayed on a main screen display interface and a secondary screen display interface in S50 comprises:

At S501: if the display mode corresponding to the display parameters is an extension mode, a first code stream matching the main screen and a second code stream matching the secondary screen are parsed from the code streams, wherein the extension mode indicates independent display of the main screen and the secondary screen.

In the extension mode, the number of display screens connected to the cloud terminal is generally greater than or equal to 2, the main/secondary relationship between the display screens connected to the cloud terminal may be set by means of an instruction, the display of the main screen and the display of the secondary screen are not synchronous, cross-screen display of pictures is supported, and desktop control events such as a keyboard and a mouse can be interacted across screens. If the corresponding display mode in the display parameters configured by the cloud terminal to the server is the extension mode, then multiple code streams are sent by the server to the cloud terminal, and a first code stream matching the main screen and a second code stream matching the secondary screen can be parsed from the multiple code streams by means of the main screen and secondary screen identifiers carried in the code streams or the resolutions corresponding to the main screen and secondary screen.

At S502: the first code stream is used to render and display a first picture on the main screen, and the second code stream is used to render and display a second picture on the secondary screen.

The main screen and the secondary screen of the cloud terminal respectively receive the code streams delivered by the server, render and display the first code stream corresponding to the main screen as a first picture on the main screen, and render and display the second code stream corresponding to the secondary screen as a second picture on the secondary screen.

In the embodiments of the present disclosure, multiple code streams delivered by the server are parsed and displayed on the main screen and the secondary screen respectively, thereby realizing multi-screen display in an extension mode of the main screen and the secondary screen.

In an implementation, if the display mode corresponding to the display parameters is an extension mode, after the code streams are displayed on a main screen display interface and a secondary screen display interface, the method further comprises: the position of a cursor is detected; a cursor control instruction is received; and a cursor display layer is switched to be the main screen or the secondary screen according to the position of the cursor and the cursor control instruction.

In the extension mode, the content on the main screen and the secondary screen can be controlled independently using a mouse or a keyboard. Upon detection that a cursor moves to a screen boundary, whether the cursor needs to be displayed on another screen is determined according to a cursor control instruction, and if so, a cursor display layer is switched, and an input event and state of the cursor in a current display layer are reserved. For example, in an example, an external display on the left side is set to be a main screen, and an external display on the right side is set to be a secondary screen. When the position of a cursor has been located at the right boundary of the main screen, if a control instruction instructing the cursor to continue to move to the right is received, the cursor is moved from the right boundary of the main screen to the left boundary of the secondary screen, the cursor display layer is switched to be the secondary screen, and the input event and state of the cursor on the secondary screen are reserved.

In the embodiments of the present disclosure, if the display mode is the extension mode, the cursor display layer is switched according to the position of the cursor and the cursor control instruction, thereby realizing cross-screen control of the cursor on the main screen and the secondary screen in the extension mode.

Referring to FIG. 4, in another implementation of this embodiment, the step that the code streams are displayed on a main screen display interface and a secondary screen display interface in S50 further comprises:

At S511: if the display mode corresponding to the display parameters is a duplicate mode, a third code stream matching the main screen is parsed from the code streams, wherein the duplicate mode indicates synchronous display of the secondary screen and the main screen.

At least two screens, i.e. a main screen and a secondary screen, are generally comprised in the duplicate mode, where the display content is synchronous, the secondary screen displays content consistent with the main screen, and interactive control can only be performed on the main screen. If the display mode corresponding to the display parameters configured by the terminal to the server is a duplicate mode, the server sends a main screen code stream to the cloud terminal via the SPICE protocol.

At S512: the third code stream is duplicated to obtain a fourth code stream.

After the cloud terminal receives and parses the main screen code stream, a terminal underlying layer replicates the main screen code stream to obtain a replicated fourth code stream.

At S513: the third code stream is used to render and display a third picture on the main screen, and the fourth code stream is used to render and display a fourth picture on the secondary screen.

The third code stream is rendered and displayed on the main screen, and the replicated fourth code stream is rendered and displayed on the secondary screen, such that the secondary screen displays a picture consistent with the main screen.

In the embodiments of the present disclosure, the code stream delivered by the server are received, parsed, and rendered and displayed on the main screen, the main screen code stream is duplicated, and the duplicated code stream is displayed on the secondary screen, thereby realizing synchronous display of the main screen and the secondary screen in the duplicate mode.

The embodiments of the present disclosure further provide a multi-screen display method applied to a server. The server is connected to a cloud terminal comprising a main screen and a secondary screen. The method comprises:

At S100: display parameters sent by the cloud terminal are received;

At S200: a display request sent by the cloud terminal is received;

At S300: code streams in response to the display request are generated according to the display parameters; and At S400: the code streams are delivered to the cloud terminal.

The multi-screen display method provided in the embodiments of the present disclosure is applied to a server. The server comprises a memory, a processor, and a computer program which is stored on the memory and capable of running on the processor, and the computer program, when executed by the processor, implements the steps of the multi-screen display method applied to the server in the embodiments of the present disclosure.

In the embodiments of the present disclosure, the server receives, via the SPICE protocol, display parameters sent by the cloud terminal, generates code streams in response to a display request according to the display parameters upon receiving the display request sent by the cloud terminal, and then delivers the code streams to the cloud terminal.

In an implementation of the embodiments of the present disclosure, the step that code streams in response to the display request are generated according to the display parameters in S300 comprises:

At S3001: if the display parameters indicate that the cloud terminal is in an extension mode, a main screen first code stream and a secondary screen second code stream in response to the display request are generated according to the resolutions corresponding to the display parameters; and At S3002: if the display parameters indicate that the cloud terminal is in a duplicate mode or a single-screen mode, a third code stream in response to the display request is generated according to the resolution corresponding to the display parameters.

The display mode configured for the cloud terminal may be an extension mode, a duplicate mode, or a single-screen mode with only a main screen or a secondary screen. When the display mode is an extension mode, the server needs to generate, according to the display parameters, multiple code streams with resolutions corresponding to those of the main screen and the secondary screen respectively, and when the display mode is a duplicate mode or a single-screen mode, the server generates one code stream.

Hereinafter, the embodiments of the present disclosure will be explained and illustrated by means of one implementation scenario.

As shown in FIG. 5, FIG. 5 is a structural block diagram of an application system in an implementation scenario of the present disclosure. The application system in an implementation scenario of the present disclosure comprises a cloud server and a cloud terminal, wherein the cloud server is connected to the cloud terminal.

A cloud desktop is a remote virtual desktop management system in the cloud server, and is mainly responsible for processing a code stream resolution request message sent by the cloud terminal, setting the relative positions of display of a main screen and a secondary screen, delivering main screen and secondary screen code streams, responding to switching of a multi-screen display mode, and the like.

In this implementation scenario, the cloud terminal is based on an Android system, and comprises two part: application software and the Android system.

The application software is responsible for creating main screen and secondary screen display windows, where the main screen display window is activity and the secondary screen display window is presentation, and switching a display mode and switching a display resolution according to a user operation. The application software is further used for sending relative position information and resolution information of the main screen and the secondary screen to the cloud desktop server, receiving multiple code streams sent from the cloud server, and rendering and displaying same on the corresponding main screen and secondary screen windows respectively.

In order to support a multi-screen display function, a mouse display module of the Android system in the implementation scenario of the present disclosure supports arbitrary switching of mouse coordinates among a plurality of display screens according to the display mode, and can determine an initial position where a cursor appears according to a configured screen logical position relationship, respond to input events, etc., so as to ensure seamless connection of the input events.

Figure 6:
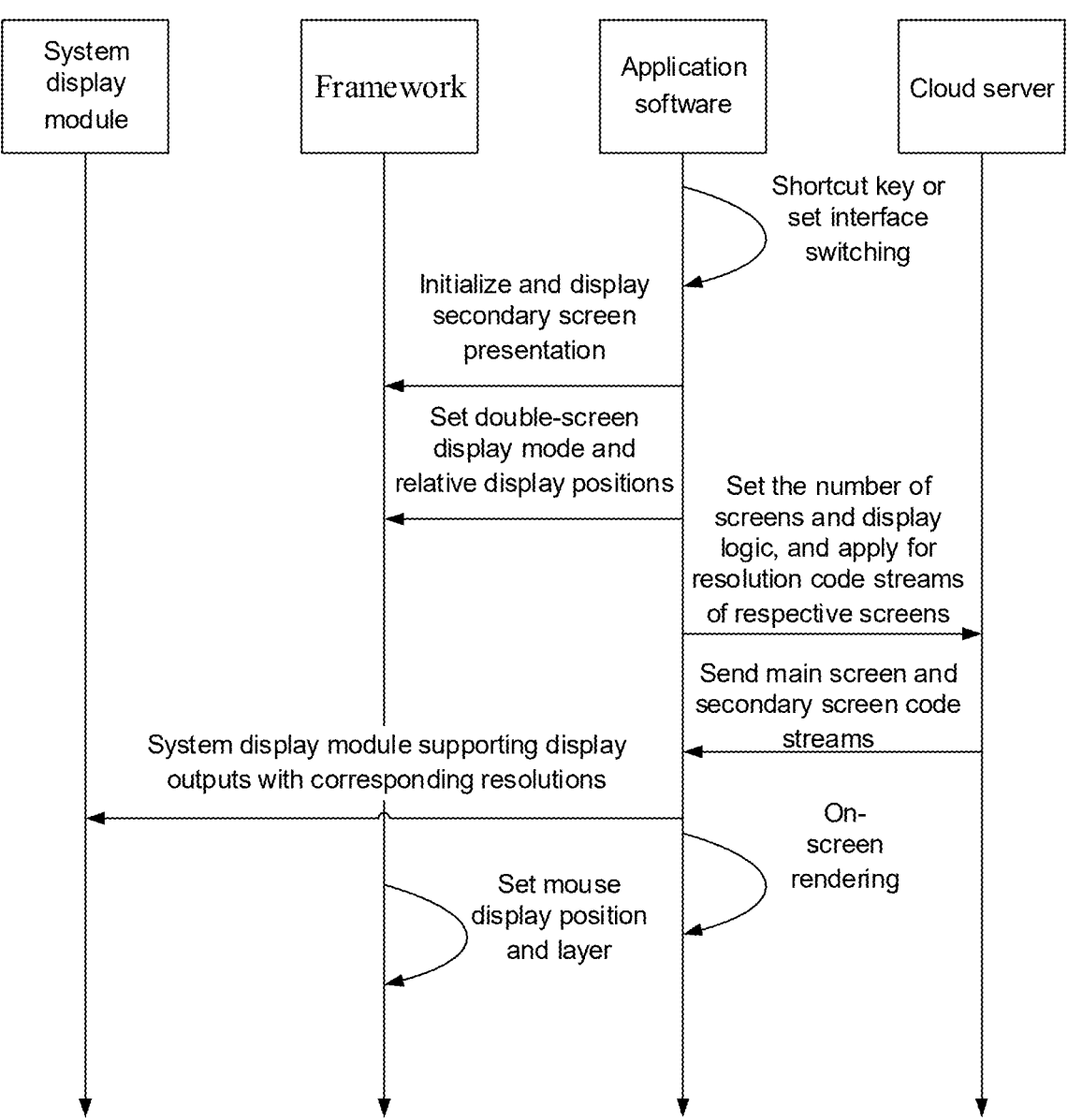
FIG. 6 is a schematic diagram of a multi-screen display process in which a display mode configured for a cloud terminal is an extension mode in an implementation scenario of the present disclosure.

FIG. 6 is a schematic diagram of a multi-screen display process in which a display mode configured for a cloud terminal is an extension mode in an implementation scenario of the present disclosure. As shown in FIG. 6, the multi-screen display method of the terminal in the extension mode comprises the following steps:

the first step: a cloud terminal receives a shortcut key or sets interface switching, initializes a secondary screen Presentation object, sets a display mode as an extension mode, and sets relative display positions of a main screen and a secondary screen;

the second step: the cloud terminal notifies, via an SPICE protocol, a server side to configure the number of screens and display logic corresponding to the display mode, and applies for resolution code streams of respective screens from the cloud server according to the resolutions of the main screen and the secondary screen;

the third step: the cloud server sends code streams corresponding to the main screen and the secondary screen to the cloud terminal;

the fourth step: the main screen and the secondary screen of the cloud terminal respectively receive the main screen and secondary screen code streams for matching, and respectively render and display pictures on the main screen and the secondary screen;

the fifth step: when a cursor moves to a screen boundary in any direction, whether the cursor needs to be displayed on another screen is determined according to a configured screen logical relationship, and if so, a cursor display layer is switched, and a current input event and state are reserved; and the sixth step: an initial position where the cursor appears is determined according to a configured screen logical position relationship, input events are responded, etc., so as to ensure seamless connection of the input events.

In the implementation scenario of the present disclosure, data stream interaction between the cloud terminal and the cloud desktop in an extension mode is realized via the SPICE protocol, and the multi-screen display function of the cloud terminal based on an Android system is realized, such that the cloud terminal can present an extended picture of the cloud desktop of the cloud server by means of an external display, cross-screen display of pictures is supported, and by configuring a logical relationship between display screens, keyboard and mouse device events can be seamlessly connected across the main screen and the secondary screen.

From the description of the described embodiments, a person skilled in the art may clearly understand that the methods according to the described embodiments may be implemented by software and a necessary universal hardware platform, and definitely may also be implemented by hardware. However, in many cases, the former is a preferred implementation. Based on such understanding, the technical solutions of the present disclosure essentially or the part contributing to the prior art may be embodied in the form of a software product. The computer software product is stored in a storage medium (such as a ROM/RAM, a magnetic disk, or an optical disk), and includes several instructions for causing a terminal device (which may be a mobile phone, a computer, a server, or a network device) to execute the methods described in the embodiments of the present disclosure.

The embodiments of the present disclosure further provide a cloud terminal, comprising a memory and a processor. The memory stores a computer program, and the processor is configured to run the computer program to execute the steps in any one of the described method embodiments.

Optionally, the cloud terminal may further comprise a transmission device and an input/output device, wherein the transmission device is connected to the processor, and the input/output device is connected to the processor.

Optionally, in this embodiment of the cloud terminal, the processor may be configured to execute the following steps via a computer program;

At S1: display parameters of display screens connected to the terminal device are configured to a server, wherein the display screens comprise a main screen and a secondary screen;

At S2: a display request is sent to the server;

At S3: code streams returned by the server in response to the display request according to the display parameters are received, wherein the code streams are generated by the server according to the resolutions in the display parameters;

At S4: a main screen and a secondary screen matching the code streams are searched for according to the display parameters; and At S5: the code streams are displayed on a main screen display interface and a secondary screen display interface.

Optionally, for specific examples in the electronic device embodiment of the present disclosure, reference may be made to the examples described in the foregoing embodiments and alternative implementations, and details are not repeatedly described herein in this embodiment.

The embodiments of the present invention further provide a storage medium. The storage medium stores a computer program, wherein the computer program is configured to execute the steps in any one of the described method embodiments when running.

Optionally, in the embodiment of the storage medium, the storage medium may be configured to store a computer program for executing the following steps:

At S1: display parameters of display screens connected to the terminal device are configured to a server, wherein the display screens comprise a main screen and a secondary screen;

At S2: a display request is sent to the server;

At S3: code streams returned by the server in response to the display request according to the display parameters are received, wherein the code streams are generated by the server according to the resolutions in the display parameters;

At S4: a main screen and a secondary screen matching the code streams are searched for according to the display parameters; and At S5: the code streams are displayed on a main screen display interface and a secondary screen display interface.

Optionally, the specific embodiments of the storage medium of the present disclosure are basically the same as the foregoing method embodiments, and details are not described herein again.

Optionally, in this embodiment, the storage medium may include, but is not limited to, any medium that can store a computer program, such as a USB flash disk, a Read-Only Memory (ROM), a Random Access Memory (RAM), a mobile hard disk, a magnetic disk, or an optical disk.

The embodiments of the present disclosure further provide a multi-screen display system. The system comprises a cloud terminal and a server, wherein the server is connected to the cloud terminal, the cloud terminal is configured to configure display parameters of the cloud terminal to the server; send a display request to the server: receive code streams returned by the server in response to the display request according to the display parameters; search, according to the display parameters, for a main screen and a secondary screen matching the code streams; and display the code streams on a main screen display interface and a secondary screen display interface; and the server is configured to receive display parameters sent by the cloud terminal; receive a display request sent by the cloud terminal; generate, according to the display parameters, code streams in response to the display request; and deliver the code streams to the cloud terminal.

In an embodiment, the cloud terminal is further configured to configure the number of display screens of the cloud terminal to the server; configure a display mode of the cloud terminal to the server, wherein the display mode is used for indicating the number of display screens connected to the cloud terminal and display logic of each display screen; and configure the resolutions of the display screens of the cloud terminal to the server.

In an embodiment, the cloud terminal is further configured to, if the display mode corresponding to the display parameters is an extension mode, parse, from the code streams, a first code stream matching the main screen and a second code stream matching the secondary screen, wherein the extension mode indicates independent display of the main screen and the secondary screen; and use the first code stream to render and display a first picture on the main screen, and use the second code stream to render and display a second picture on the secondary screen.

In an embodiment, the cloud terminal is further configured to detect the position of a cursor; receive a cursor control instruction; and switch a cursor display layer to be the main screen or the secondary screen according to the position of the cursor and the cursor control instruction.

In an embodiment, the cloud terminal is further configured to, if the display mode corresponding to the display parameters is a duplicate mode, parse a third code stream matching the main screen from the code streams, wherein the duplicate mode indicates synchronous display of the secondary screen and the main screen; duplicate the third code stream to obtain a fourth code stream; and use the third code stream to render and display a third picture on the main screen, and use the fourth code stream to render and display a fourth picture on the secondary screen.

In an embodiment, the server is further configured to, if the display parameters indicate that the cloud terminal is in an extension mode, generate, according to the resolutions corresponding to the display parameters, a main screen first code stream and a secondary screen second code stream in response to the display request; and if the display parameters indicate that the cloud terminal is in a duplicate mode or a single-screen mode, generate, according to the resolutions corresponding to the display parameters, a third code stream in response to the display request.

Optionally, the cloud terminal and the server in the system according to the embodiments of the present disclosure store a computer program, and the computer program is configured to execute the steps in any one of the described method embodiments when running. The specific embodiments of the system in the present disclosure are basically the same as the foregoing method embodiments, and details are not described herein again.

The sequence numbers of the embodiments of the present disclosure are only for description, and do not represent the preference of the embodiments.

In the foregoing embodiments of the present disclosure, the description of each embodiment has its emphasis, and for the part not described in detail in a certain embodiment, reference may be made to the relevant description of other embodiments.

In the several embodiments provided in the present disclosure, it should be understood that the disclosed technical content may be implemented in other manners. The apparatus embodiments described above are merely exemplary. For example, division of the units is merely logical function division, and there may be other division manners in actual implementation. For example, a plurality of units or components may be combined or integrated into another system, or some features may be ignored or not executed. In addition, the displayed or discussed mutual couplings or direct couplings or communication connections may be indirect couplings or communication connections between units or modules via some interfaces, and may be in the form of electrical or other forms.

The units described as separate parts may or may not be physically separate, and parts displayed as units may or may not be physical units, may be located in one position, or may be distributed on a plurality of network elements. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The described integrated unit may be implemented in the form of hardware, and may also be implemented in the form of a software functional unit.

If the integrated unit is implemented in the form of a software functional unit and sold or used as an independent product, the integrated unit may be stored in a computer readable storage medium. Based on such an understanding, the technical solutions of the present disclosure essentially, or the part making contribution to the prior art, or all or some of the technical solutions may be embodied in the form of a software product. The computer software product is stored in a storage medium, and comprises several instructions to enable a computer device (which may be a personal computer, a server, a network device, or the like) to perform all or some of the steps of the method described in the embodiments of the present disclosure. The foregoing storage medium includes any medium that can store program codes, such as a USB flash disk, a Read-Only Memory (ROM), a Random Access Memory (RAM), a mobile hard disk, a magnetic disk, or an optical disk.

The above are only preferred embodiments of the present disclosure. It should be noted that, for persons of ordinary skill in the art, several improvements and modifications may be made without departing from the principle of the present disclosure, and these improvements and modifications shall also belong to the scope of protection of the present disclosure.

What is claimed is:

1. A multi-screen display method, applied to a cloud terminal comprising a main screen and a secondary screen, the method comprising:

configuring display parameters of the cloud terminal to a server;

sending a display request to the server;

receiving code streams returned by the server in response to the display request according to the display parameters, wherein the code streams are generated by the server according to the resolutions in the display parameters;

searching, according to the display parameters, for a main screen and a secondary screen matching the code streams; and displaying the code streams on a main screen display interface and a secondary screen display interface;

wherein displaying the code streams on the main screen display interface and the secondary screen display interface comprises:

in a case that the display mode corresponding to the display parameters is an extension mode, parsing, from the code streams, a first code stream matching the main screen and a second code stream matching the secondary screen, wherein the extension mode indicates independent display of the main screen and the secondary screen; and using the first code stream to render and display a first picture on the main screen, and using the second code stream to render and display a second picture on the secondary screen;

and/or, in a case that the display mode corresponding to the display parameters is a duplicate mode, parsing a third code stream matching the main screen from the code streams, wherein the duplicate mode indicates synchronous display of the secondary screen and the main screen; duplicating the third code stream to obtain a fourth code stream; and using the third code stream to render and display a third picture on the main screen, and using the fourth code stream to render and display a fourth picture on the secondary screen.

2. The multi-screen display method according to claim 1, wherein configuring the display parameters of the cloud terminal to the server comprises:

configuring the number of display screens of the cloud terminal to the server;

configuring a display mode of the cloud terminal to the server, wherein the display mode is used for indicating the number of display screens connected to the cloud terminal and display logic of each display screen connected to the cloud terminal; and configuring the resolutions of the display screens of the cloud terminal to the server.

3. The multi-screen display method according to claim 1, wherein if the display mode corresponding to the display parameters is an extension mode, after displaying the code streams on the main screen display interface and the secondary screen display interface, the method further comprises:

detecting the position of a cursor;

receiving a cursor control instruction; and switching a cursor display layer to be the main screen or the secondary screen according to the position of the cursor and the cursor control instruction.

4. The multi-screen display method according to claim 3, wherein switching a cursor display layer to be the main screen or the secondary screen according to the position of the cursor and the cursor control instruction comprises:

upon detection that the cursor moves to a screen boundary, whether the cursor needs to be displayed on another screen is determined according to the cursor control instruction.

5. A non-transitory storage medium, wherein the storage medium stores a computer program which, when executed by a processor, implements the steps of the multi-screen display method according to claim 1.

6. The multi-screen display method according to claim 1, wherein the method further comprises:

matching IDs or device numbers of the main screen and the secondary screen with ID addresses or device numbers of target screens comprised in the code streams returned by the server, so as to search for the main screen and the secondary screen matching the code streams.

7. The multi-screen display method according to claim 1, wherein the method further comprises:

receiving the code streams delivered by the server through the SPICE desktop protocol, and displaying same on matched main screen display interface and secondary screen display interface of the cloud terminal.

8. The multi-screen display method according to claim 1, wherein the method further comprises:

in the case that the display mode corresponding to the display parameters is an extension mode, setting the main/secondary relationship between the display screens connected to the cloud terminal by means of an instruction.

9. The multi-screen display method according to claim 1, wherein the number of display screens connected to the cloud terminal is greater than or equal to 2.

10. The multi-screen display method according to claim 1, wherein the method further comprises:

controlling the content on the main screen and the secondary screen independently using a mouse or a keyboard.

11. A multi-screen display method, applied to a server which is connected to a cloud terminal, the method comprising:

receiving display parameters sent by the cloud terminal;

receiving a display request sent by the cloud terminal;

generating, according to the display parameters, code streams in response to the display request; and delivering the code streams to the cloud terminal;

wherein generating, according to the display parameters, the code streams in response to the display request comprises:

in a case that the display parameters indicate that the cloud terminal is in an extension mode, generating, according to the resolutions corresponding to the display parameters, a main screen first code stream and a secondary screen second code stream in response to the display request;

in a case that the display parameters indicate that the cloud terminal is in a duplicate mode or a single-screen mode, generating, according to the resolution corresponding to the display parameters, a third code stream in response to the display request.

12. A cloud terminal, wherein the cloud terminal comprises a memory, a processor, and a computer program which is stored on the memory and capable of running on the processor, and the computer program, when executed by the processor, implements the following operations:

configuring display parameters of the cloud terminal to a server;

sending a display request to the server;

receiving code streams returned by the server in response to the display request according to the display parameters, wherein the code streams are generated by the server according to the resolutions in the display parameters;

searching, according to the display parameters, for a main screen and a secondary screen matching the code streams; and displaying the code streams on a main screen display interface and a secondary screen display interface;

wherein the computer program implements the operation of displaying the code streams on the main screen display interface and the secondary screen display interface by following operations:

in a case that the display mode corresponding to the display parameters is an extension mode, parsing, from the code streams, a first code stream matching the main screen and a second code stream matching the secondary screen, wherein the extension mode indicates independent display of the main screen and the secondary screen; and using the first code stream to render and display a first picture on the main screen, and using the second code stream to render and display a second picture on the secondary screen;

and/or, in a case that the display mode corresponding to the display parameters is a duplicate mode, parsing a third code stream matching the main screen from the code streams, wherein the duplicate mode indicates synchronous display of the secondary screen and the main screen; duplicating the third code stream to obtain a fourth code stream; and using the third code stream to render and display a third picture on the main screen, and using the fourth code stream to render and display a fourth picture on the secondary screen.

13. The cloud terminal according to claim 12, wherein the computer program further implements the following operations:

configuring the number of display screens of the cloud terminal to the server;

configuring a display mode of the cloud terminal to the server, wherein the display mode is used for indicating the number of display screens connected to the cloud terminal and display logic of each display screen; and configuring the resolutions of the display screens of the cloud terminal to the server.

14. The cloud terminal according to claim 12, wherein the computer program further implements the following operations:

detecting the position of a cursor;

receiving a cursor control instruction; and switching a cursor display layer to be the main screen or the secondary screen according to the position of the cursor and the cursor control instruction.

15. A multi-screen display system, the system comprising a cloud terminal and a server, wherein the server is connected to the cloud terminal, the cloud terminal is configured to configure display parameters of the cloud terminal to the server; send a display request to the server; receive code streams returned by the server in response to the display request according to the display parameters; search, according to the display parameters, for a main screen and a secondary screen matching the code streams; and display the code streams on a main screen display interface and a secondary screen display interface; and the server is configured to receive display parameters sent by the cloud terminal; receive a display request sent by the cloud terminal; generate, according to the display parameters, code streams in response to the display request; and deliver the code streams to the cloud terminal;

wherein the cloud terminal implements the operation of displaying the code streams on the main screen display interface and the secondary screen display interface by following operations:

in a case that the display mode corresponding to the display parameters is an extension mode, parsing, from the code streams, a first code stream matching the main screen and a second code stream matching the secondary screen, wherein the extension mode indicates independent display of the main screen and the secondary screen; and using the first code stream to render and display a first picture on the main screen, and using the second code stream to render and display a second picture on the secondary screen;

and/or, in a case that the display mode corresponding to the display parameters is a duplicate mode, parsing a third code stream matching the main screen from the code streams wherein the duplicate mode indicates synchronous display of the secondary screen and the main screen; duplicating the third code stream to obtain a fourth code stream; and using the third code stream to render and display a third picture on the main screen, and using the fourth code stream to render and display a fourth picture on the secondary screen.

* * * * *